United States Patent [19]

Miura et al.

[11] Patent Number: 4,716,787
[45] Date of Patent: Jan. 5, 1988

[54] AUTOMATIC TRANSMISSION MECHANISM

[75] Inventors: Masakatsu Miura, Kariya; Hideyuki Aoki, Anjo, both of Japan

[73] Assignee: Aisin-Warner Kabushiki Kaisha, Aichi, Japan

[21] Appl. No.: 833,378

[22] Filed: Feb. 26, 1986

[30] Foreign Application Priority Data

Oct. 16, 1985 [JP] Japan .................................. 60-230809
Dec. 16, 1985 [JP] Japan .................................. 60-282583

[51] Int. Cl.$^4$ ......................... F16H 57/10; F16D 25/10
[52] U.S. Cl. ......................................... 74/761; 74/695;
74/701; 192/87.11; 192/87.16
[58] Field of Search ................. 74/761, 760, 753, 695,
74/701, 688, 606 R; 192/87.1, 87.11, 87.12,
87.13, 87.14, 87.15, 87.16, 87.17, 87.18, 87.19

[56] References Cited

U.S. PATENT DOCUMENTS

| | | | |
|---|---|---|---|
| 3,279,573 | 10/1966 | Hensel | 192/87.15 X |
| 3,355,966 | 12/1967 | Boehm | 74/761 X |
| 3,359,827 | 12/1967 | Chapman et al. | 74/688 X |
| 3,365,985 | 1/1968 | Johnson | 192/87.11 X |
| 3,746,138 | 7/1973 | Forster et al. | 192/87.11 |
| 3,747,730 | 7/1973 | Hause | 192/87.11 |
| 3,877,320 | 4/1975 | Iijima | 74/753 X |
| 4,027,552 | 6/1977 | Murakami et al. | 74/753 X |
| 4,417,484 | 11/1983 | Gaus et al. | 74/688 |
| 4,454,786 | 6/1984 | Stockton | 74/688 |
| 4,480,499 | 11/1984 | Kubo et al. | 74/695 |
| 4,513,634 | 4/1985 | Ohtsuka | 74/753 X |
| 4,592,250 | 6/1986 | Plasencia et al. | 74/731 X |

FOREIGN PATENT DOCUMENTS

| | | | |
|---|---|---|---|
| 0041730 | 12/1981 | European Pat. Off. | |
| 966355 | 8/1964 | United Kingdom | 192/87.11 |
| 1108631 | 4/1968 | United Kingdom | |
| 1256988 | 12/1971 | United Kingdom | |
| 2132289 | 7/1974 | United Kingdom | 74/695 |
| 1445515 | 8/1976 | United Kingdom | |
| 1525593 | 9/1978 | United Kingdom | |
| 2030246 | 4/1980 | United Kingdom | |

Primary Examiner—Leslie Braun
Assistant Examiner—Joseph M. Rolnicki
Attorney, Agent, or Firm—Wenderoth, Lind & Ponack

[57] ABSTRACT

Sun gears of a single planetary gear unit and a dual planetary gear unit are connected with respect to each other, carriers of the respective gear units in the connected state are connected to an output member, an input member is connected to a ring gear of the single planetary gear unit through a first clutch and also to a sun gear through a second clutch, and the sun gear and a ring gear of the dual planetary gear unit are stoppable by retaining means. When travelling forward, the ring gear of the single planetary gear unit is inputted with torque from the input member based on the state of connection of the first clutch.

6 Claims, 11 Drawing Figures

|   |   | $C_1$ | $C_2$ | $C_0$ | $B_1$ | $B_2$ | $B_3$ | $F_1$ | $F_2$ | $F_0$ |
|---|---|---|---|---|---|---|---|---|---|---|
|   | P |   |   |   |   |   |   |   |   |   |
|   | R |   | ○ |   |   |   | ○ |   |   |   |
|   | N |   |   |   |   |   |   |   |   |   |
| D | 1 | ○ |   |   |   |   |   |   | ○ |   |
|   | 2 | ○ |   |   |   | ○ |   | ○ |   |   |
|   | 3 | ○ |   | ○ |   | (○) |   |   |   | ⊙ |
|   | 4 |   |   | ○ | ○ | (○) |   | (○) |   |   |
| 3 | 1 | ○ |   |   |   |   |   |   | ○ |   |
|   | 2 | ○ |   |   |   | ○ |   | ○ |   |   |
|   | 3 | ○ |   | ○ |   | (○) |   |   |   | ⊙ |
| 2 | 1 | ○ |   |   |   |   |   |   | ○ |   |
|   | 2 | ○ |   |   | ○ | ○ |   | ○ |   |   |
| 1 | 1 | ○ |   |   |   |   | ○ |   | ○ |   |

FIG. 8

| | | 3 speed A/T part 10₁ | | | | | | annexed transmission part 20₂ | | |
|---|---|---|---|---|---|---|---|---|---|---|
| | | C₁ | C₂ | B₁ | B₂ | B₃ | F₁ | F₂ | C₃ | B₄ | F₃ |
| | P | | | | | | | | | O | |
| | R | | O | | O | | | | | O | |
| | N | | | | | | | | | O | | 
| D | 1 | O | | | | | | O | | O | O |
| | 2 | O | | | O | | O | | | O | O |
| | 3 | O | | | O | | O | | O | | |
| | 4 | O | O | | ⊙ | | | | O | | |
| 3 | 1 | O | | | | | | O | | O | O |
| | 2 | O | | | O | | O | | | O | O |
| | 3 | O | O | | ⊙ | | | | | O | O |
| 2 | 1 | O | | | | | | O | | O | O |
| | 2 | O | | O | O | | O | | | O | O |
| 1 | 1 | O | | | | O | | O | | O | O |

|  | $C_1$ | $C_2$ | $C_0$ | $B_1$ | $B_2$ | $B_3$ | $F_1$ | $F_2$ | $F_0$ |
|---|---|---|---|---|---|---|---|---|---|
| 1ST | ○ |  |  |  |  | △ |  | ○ |  |
| 2ND | ○ |  |  | △ | ○ |  | ○ |  |  |
| 3RD | ○ |  | ○ |  | ○ |  |  |  | ⊙ |
| 4TH |  |  | ○ | ○ | ○ |  |  |  |  |
| REV |  | ○ |  |  |  | ○ |  |  |  |

PRIOR ART

AUTOMATIC TRANSMISSION MECHANISM

BACKGROUND OF THE INVENTION

1. Field of the Invention

This invention relates to an automatic transmission, particularly to an automatic transmission for an automobile which is used together with a torque converter, and more particularly to an automatic transmission mechanism which achieves three forward speeds by the use of two planetary gear units.

2. Description of the Related Art

Generally, an automatic transmission is formed of the so-called Simpson type including two single planetary gear units, a sun gear of both planetary units being commonly used and a carrier of the first planetary gear unit being integrally connected to a ring gear of the second planetary gear unit. In this type of a conventional transmission, the three forward speed are achieved as follows. That is, the driving force is selectively inputted by the ring gear and/or sun gear of the first planetary gear unit, the sun gear and the carrier of the second planetary gear unit are retained by a brake or one-way clutch, and the driving force is outputted from the ring gear of the second planetary gear unit integrally connected to the carrier of the first planetary gear unit.

And, the transmission mechanism includes a first (forward) clutch for connecting an input member to the ring gear of the first planetary gear unit and a second (direct) clutch for connecting the input member to the sun gear. These clutches are disposed parallel with respect to each other in the axial direction and are controlled by a separate hydraulic actuator and return spring, respectively.

A conventional four speed automatic transmission employs the aforementioned three speed automatic transmission including two planetary gear units as a base, and in addition an over drive (O/D) mechanism or under drive (U/D) mechanism attached thereto and comprising a planetary gear unit in order to obtain a gear change stage for the four forward speeds.

In recent years, in view of an ever growing demand for FF (front engine front drive), high horse power, etc. of vehicles for example, the automatic transmission is required to be made much smaller. In addition, the transmitting torque capacity is required to be made larger. However, because the conventional automatic transmission mechanism include clutches disposed parallel with respect to each other in the axial direction and operated by separate means as mentioned above, the the transmission must be long in the axial direction, and is thus unable to meet with the demand for a much smaller transmission. Further, the conventional four speed automatic transmission comprising three planetary gear units provided with the O/D mechanism, etc. can hardly satisfy the above demand.

Under the circumstances, there an automatic transmission mechanism has been proposed which additionally attaches two clutches to the conventional so-called Simpson type planetary gear units for obtaining four speeds in Japanese Patent Laid-open Application No. 59(1984)-183147. That is, the mechanism of the automatic transmission is constituted such that a third clutch is disposed between the sun gear of the first planetary gear unit and the sun gear of the second planetary gear unit which are integrally connected with respect to each other in the conventional Simpson type. At the same time, the sun gear of the first gear unit communicates with the carrier of the second gear unit through a fourth clutch, the third clutch is disengaged to separate the first gear unit from the second gear unit, the forth clutch is connected in order to give an input to the carrier of the second gear unit, and at the same time, the sun gear of the second gear unit is fixed to output an overdrive from the ring gear to obtain a fourth speed in addition to the three speeds.

However, even in the above mentioned improved four speed automatic transmission mechanism, the clutches are disposed parallel with respect each other in the axial direction and separate means for operation thereof are included, as in the case of the Simpson type. In addition, many clutches are required to separate both the gear units. Due to the foregoing, the mechanism must be long in the axial direction and therefore, it is impossible to meet with the aforementiond demand for a much smaller transmission. Furthermore, since the output member is located in the front end portion, the clutches are physically impossible to be put together on the front end portion of the mechanism which, if possible, is a desirable location for easy replacement and alternation, and the three speed automatic transmission mechanism and four speed automatic transmission mechanism must be manufactured separately. Due to the foregoing, common use of parts and of an assembly line are difficult to attain, and small production of many kinds of parts often invite a significant increase of cost, and thus the requirements of recent demands for various kinds of vehicles and wide variations thereof are unable to be met.

In view of the above, attention is drawn to the so-called Ravigneaux type automatic transmission mechanism, wherein two units of carriers are integrally formed and which is expected to be made much smaller.

The Ravigneaux type automatic transmission mechanism 1, as shown in FIG. 10, comprises a single planetary gear unit 2 and a dual planetary gear unit 3. An input member I is connected to a sun gear $S_2$ of the dual unit 3 through a clutch $C_1$, and also to a sun gear $S_1$ of the single unit 2 through a clutch $C_2$ or one-way clutch $F_o$. The input member I is further connected to a carrier $CR_2$ supporting dual pinions $P_2$, $P'_2$ and to a first carrier $CR_1$ which is integrally connected to the second carrier $CR_2$, through a clutch $C_o$. An output member O is connected to ring gears $R_1$ and $R_2$ of both the units 2 and 3 which are connected with each other and integrally rotated.

And, the Ravigneaux type automatic transmission, as shown in an operation table of FIG. 11, offers first speed through fourth speed (1st through 4th) and reverse (Rev) according to actuation of the respective clutches $C_1$, $C_2$ and $C_o$, the respective brakes $B_1$, $B_2$ and $B_3$, and the respective one-way clutches $F_1$, $F_2$ and $F_o$. In the figure, ○ denotes coupling of clutches and actuation of brakes and one-way clutches, △ denotes actuation only during coast time, and ⊙ denotes actuation only when gears are shifted and thereafter sychronous rotation is effected.

However, in the Ravigneaux type automatic transmission mechanism, since engine torque is inputted to sun gears $S_2$ ($S_1$), the tangential force acting on the sun gear having a smaller diameter is high and in particular this is significant in the case of the first speed wherein the transmitting torque is large. On the other hand, there are problems in that durability of the gear face of the sun gear $S_2$ is not satisfactory and also, durability of a brake $B_3$ and one-way clutch $F_2$ which often receive the reaction force of the carriers $CR_1$ and $CR_2$ is problematical. Because of the foregoing, allowable input torque is limited to a low value, thus, recent time demands for high horse power are unable to be met. Any attempt to make the allowable input torque larger requires an increase in the thickness of a gear width of the sun gear. Furthermore, tolerance of retaining means such as brakes, etc. is required to be made larger which again results in a large size of an automatic transmission, and problems arise in loading on vehicles.

SUMMARY OF THE INVENTION

It is therefore an object of the present invention to provide a three speed automatic transmission mechanism which can be made small while maintaining a predetermined allowable input torque by inputting torque from an input member to a ring gear of a planetary gear unit, and wherein most of the parts are commonly used so that it can be modified to a forward four speed transmission mechanism with a minor change.

That is, the present invention is constituted such that sun gears of a single planetary gear unit and a dual planetary gear unit are connected with each other, a carrier is connected to an output member, an input member is connected to a ring gear of the single planetary gear unit through a first clutch and also to the sun gear through a second clutch, and the sun gears and a ring gear of the dual planetary gear unit are stoppable by retaining means, when travelling forward, torque from the input member being inputted in the ring gear of the single planetary gear unit based on its connection with the first clutch.

According to the present invention, although it employs a system in which a reduction in size is facilitated by integrally connecting the carriers with respect to each other, the allowable input torque can be made large while the tangential force acting on the gear face is small, without requiring an increase in the the gear width thickness and the tolerance of the retaining means, since torque from the input member is normally inputted in the ring gear except when travelling in reverse, thus enabling the power tendency of recent time demands for high horse power to be met. Since the carriers are integrally connected with each other and the sun gears are also integrally connected, the mechanism of the present invention can be made compact, thus enabling limitations of installation space due to FF, etc. to be coped with the problems with respect to the loading on vehicles to be overcome. Furthermore, a four speed automatic transmission mechanism can be obtained from a modification of a three speed automatic transmission mechanism with a simple addition of the third clutch $C_o$ (and the third one-way clutch $F_o$), and manufacturing equipment and parts can be commonly used. Thus, many kinds and small quantity production can be facilitated is required when producing may kinds of vehicles without increasing the cost.

BRIEF DESCRIPTION OF THE DRAWINGS

FIG. 8 is an illustration showing the actuating state of the respective elements of FIG. 7;

DESCRIPTION OF THE PREFERRED EMBODIMENT

Figures 1, 2:
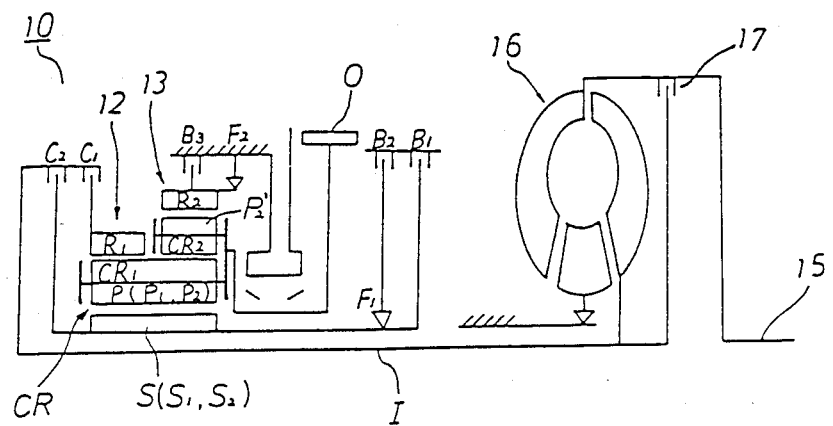
FIG. 1 is a schematic view showing one example of a three speed automatic transmission mechanism according to the present invention.
FIG. 2 is an illustration showing the actuating state of the respective elements thereof.

A three speed transmission mechanism 10, as shown in FIG. 1, comprises a single planetary gear unit 12 and a dual planetary gear unit 13. Carriers CR ($CR_1$ and $CR_2$) of both the planetary gear units 12 and 13 are integrally connected with respect to each other.

Sun gears S ($S_1$ and $S_2$) of both the planetary gear units 12 and 13 are connected with each other. The carrier CR is connected to an output member O. An input member I connected from an engine output shaft 15 through a torque converter 16 or a lock-up clutch 17 is connected to a ring gear $R_1$ of the single planetary gear unit 12 through a first clutch $C_1$ and also to the sun gears S through a second clutch $C_2$. The sun gears S and ring gears $R_2$ of the dual planetary gear 13 can be stopped by retaining means such as brakes $B_1$, $B_2$ and $B_3$, one-way clutch $F_1$ and one-way brake $F_2$, etc. According to operation of the first clutch $C_1$, torque is inputted to the ring gear $R_1$ of the single planetary gear unit 12 from the input member I when travelling forward. The retaining means of the sun gear S preferably comprises the first brake $B_1$ for directly braking the rotation of the sun gear S and the second brake $B_2$ for restricting the unidirectional rotation through the first one-way clutch $F_1$. The retaining means of the ring gear $R_2$ of the dual planetary gear unit 13 preferably comprises a third brake $B_3$ for directly braking the ring gear and a second one-way brake $F_2$ for restricting the unidirectional rotation of the ring gear. The first clutch $C_1$ and the second clutch $C_2$ are preferably disposed together on the front end portion of the automatic transmission mechanism 10.

Figures 3, 4:
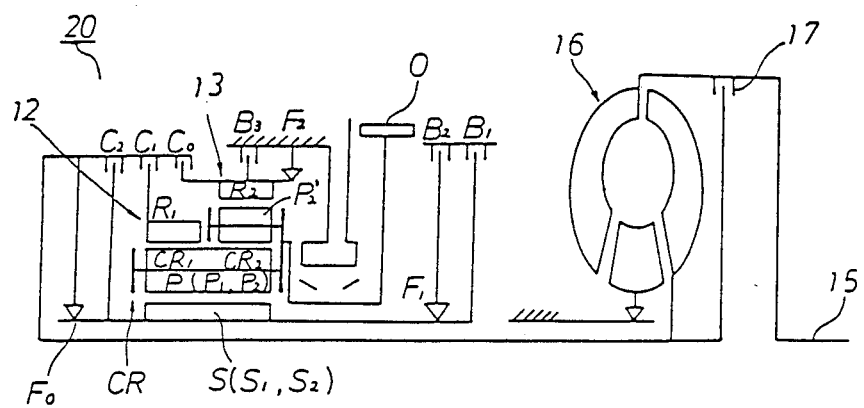
FIG. 3 is a schematic view of one example of a four speed automatic transmission mechanism which is obtainable by slightly modifying the third speed automatic transmission mechanism of FIG. 1.
FIG. 4 is an illustration showing the actuation state of the respective elements thereof.

As shown in FIG. 3, if the input member 1 is connected to the ring gear $R_2$ of the dual planetary gear 13 thrugh the third clutch $C_o$ in a modification of the three speed automatic transmission 10, a four speed automatic transmission mechanism 20 can be obtained. In this case, a third one-way brake $F_o$ for restricting the rotation of the sun gear S in order not to exceed the rotation of the input member I is preferably disposed between the input member I and the sun gear S.

With the above constitution, the three speed automatic transmission mechanism 10 is operated as in the illustration shown in FIG. 2. That is, in the first speed state of D range, the second (forward) clutch $C_1$ is connected. Then, rotation of the input member (shaft) I is transmitted to the ring gear $R_1$ of the single unit 12 through the clutch $C_1$. Since the ring gear $R_2$ of the dual unit 13 is prevented from rotating by the second one-way brake $F_2$ in the foregoing state, the common carrier CR is rotated in the normal direction at extensively reduced speed while rotating the sun gear S rotates idly in the reverse direction, and the rotation is taken off from the output member (gear) O. In the second speed state, the second brake $B_2$ is actuated in addition to the connection of the first clutch $C_1$. Then, the sun gear S is stopped from rotating due to actuation of the first one-way clutch $F_1$ according to the brake $B_2$. Accordingly, rotation of the ring $R_1$ from the input member I causes the carrier CR to rotate in the normal direction at a reduced speed while causing the ring gear $R_2$ of the dual unit 13 to rotate idly in the normal direction, and the rotation is taken off as second speed at the output member O. In the third speed state, the second (direct) clutch $C_2$ is connected in addition to the connection of the first (forward) clutch $C_1$. Then rotation of the input member I is transmitted to the sun gear S as well as the ring gear $R_1$, and the planetary gear units 12 and 13 are integrally rotated. Accordingly, the carrier CR is integrally rotated and the same speed of rotation as that of the input member I is taken off from the output member O. At this time, if the second brake $B_2$ is disengaged before the direct clutch $C_2$ is connected, it returns to the first state. In order to avoid the foregoing, the second brake $B_2$ is disengaged after the clutch $C_2$ is connected or otherwise maintained in its engaging state. In the reverse (R) range, the second clutch $C_2$ and the third (1st.reverse) brake $B_3$ are actuated. Then, rotation of the input member I is transmitted to the sun gear S through the clutch $C_2$. Since the ring gear $R_2$ of the dual unit 13 is fixed in the foregoing state, the carrier CR is also rotated in the reverse direction while causing the ring gear $R_1$ of the single unit 12 to rotate in the reverse direction and the reverse rotation of the carrier is taken off at the output member O. In the first range, the third brake $B_3$ is actuated in addition to the first speed state of the D range. Accordingly, when the engine brake is actuated (i.e. when the input and output are rotated in the reverse way), although an idle rotation state is created in the D range since the transmission is cut off by the one-way brake $F_2$, the first speed state is maintained since the ring gear $R_2$ is fixed by the brake $B_3$ in 1 range. The first speed of 2 range is equivalent to the first speed of the D range, and in the second speed, the first brake (2nd coast brake) $B_1$ is actuated in addition to the second speed state of the D range. Then, when the engined brake is actuated, although an idle rotation state is created by the one-way clutch $F_1$ in the D range, the second speed state is maintained since the sun gear S is fixed by the brake $B_1$ in 2 range.

Next, the four speed automatic transmission mechanism 20 will be described which is constituted by slightly modifying the aforementioned three speed automatic transmission mechanism with reference to FIG. 4. Since the operation at R range and 2 range, and at first speed and second speed in 1 range and D range is the same as that in the three speed automatic transmission mechanism 10 described, description thereof will be omitted.

In the third speed state in the D range, the third clutch $C_o$ is connected in addition to the connection of the first clutch $C_1$. Then, rotation of the input member I is transmitted to the ring gear $R_1$ of the single unit 12 through the clutch $C_1$ and at the same time, to the ring gear $R_2$ of the dual unit 13 through the clutch $C_o$. Accordingly, the respective elements of both the planetary gear units 12 and 13 are integrally rotated and a same speed rotation as that of the input member I is transmitted to the output member O from the carrier CR. At this time, the second brake $B_2$ is maintained in the retaining state until the clutch $C_o$ is coupled in order to prevent the transmission from temporarily returning to the first speed state from the second speed state, and in the state that coupling of the clutch $C_o$ is completed and the planetary units 12 and 13 are integrally rotated, the one-way brake $F_o$ is rotated synchronously. And, in the fourth speed state, the first clutch $C_1$ is disengaged and the first brake $B_1$ is actuated. Then rotation of the input member I is transmitted to the ring gear $R_2$ of the dual unit 13 through the clutch $C_o$. Since the sun gear S is stopped in the foregoing state, the carrier CR is rotated at a high speed while causing the single unit ring gear $R_1$ to rotate idly at an increased speed, and the high speed rotation is taken off as an over drive at the output member O. When an up-shift is effected to shift from third speed to fourth speed, based on the constitution that the first clutch $C_1$ is is disengaged before the first brake $B_1$ is actuated and the speed of the sun gear S is prevented from being accelerated by the one-way brake $F_o$, sufficient time is allowed for the retaining operation of the first brake $B_1$ in order to facilitate the operation timing thereof and a smooth shift can be obtained by preventing a possible occurrence of a shift shock due to change of grasping. At this time, the second brake $B_2$ and the first one way clutch $F_1$ may be coupled. At the same time, when a down-shift is effected from fourth speed to third speed, because of the presence of the one-way brake $F_o$, the sun gear S is prevented from being rotated in the normal direction at a higher speed than the input member I due to the release of the first brake $B_1$, so that a sufficient time is made available to the first clutch $C_1$ for coupling, operation timing can be facilitated, and the possible occurrence of a shift shock due to change of grasping can be prevented to obtain a smooth shift. The 3 range is same as the first speed, second speed and third speed in the D range.

A more specific embodiment of the present invention will be described with reference to FIG. 5 and FIG. 6.

Figure 5:
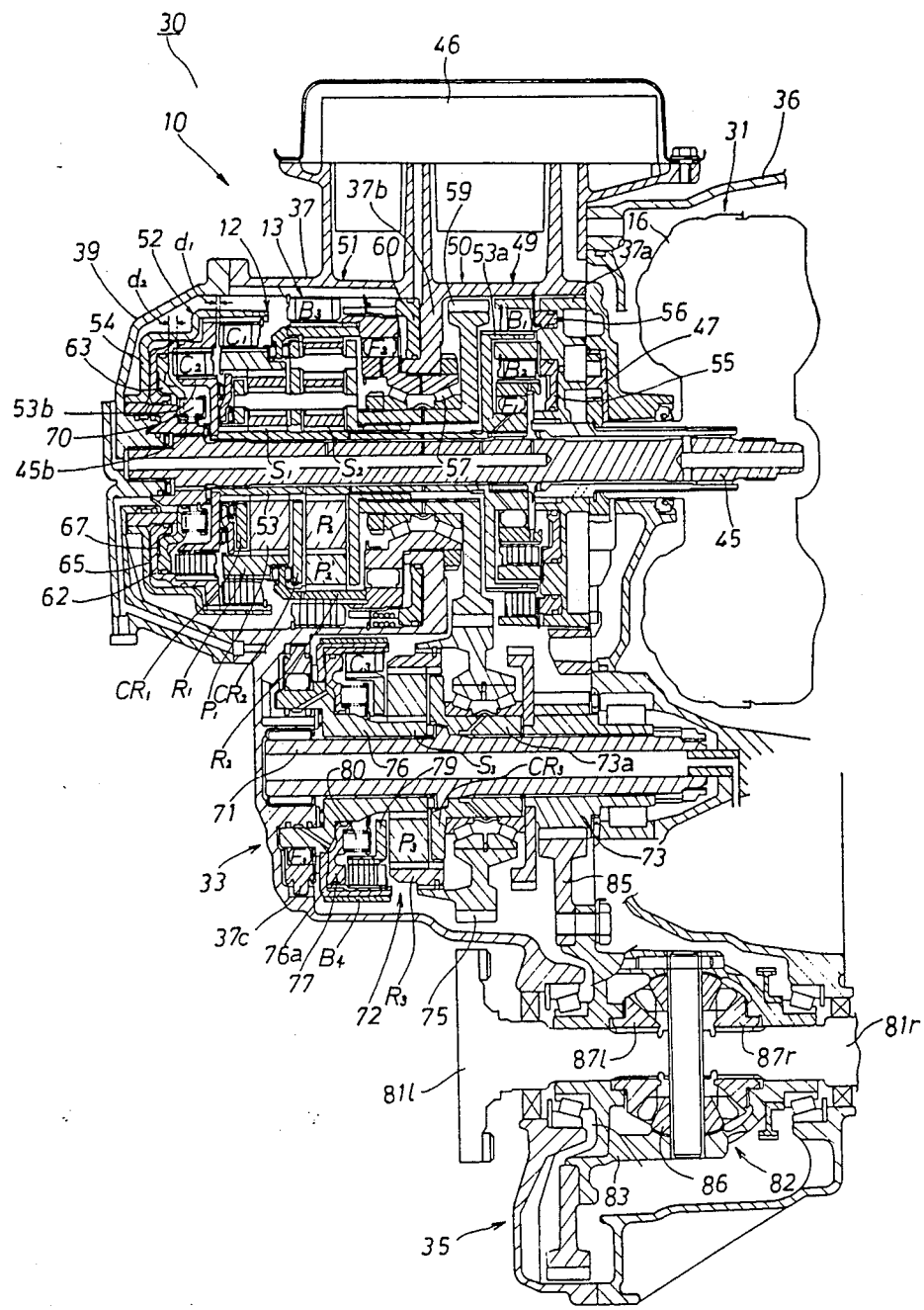
FIG. 5 is a sectional view showing one embodiment of an automatic transmission embodying the present invention more specifically.
Figure 6:
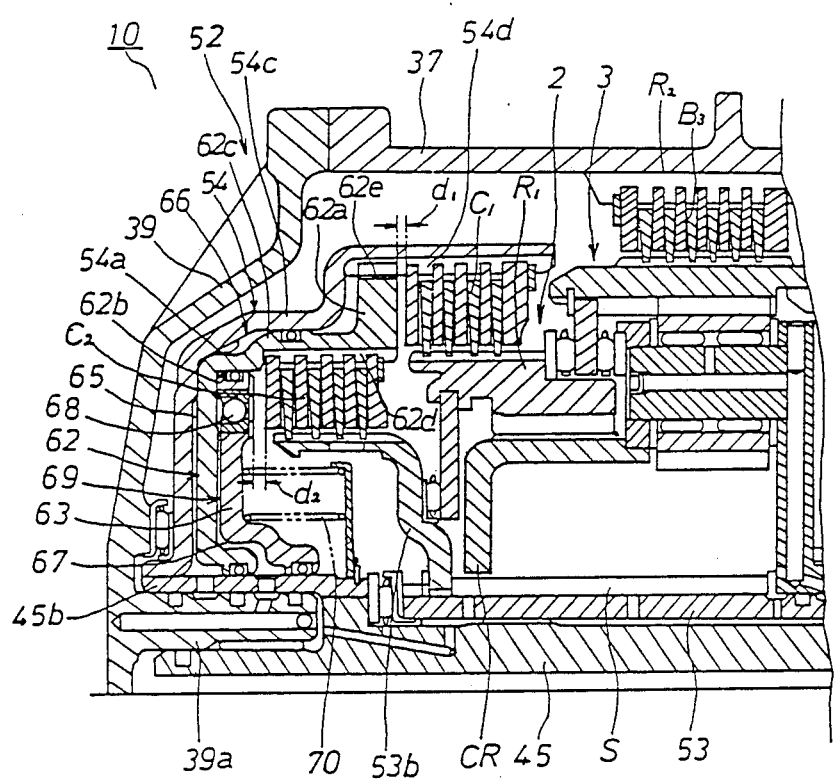
FIG. 6 is an enlarged sectional view of a clutch portion of the automatic transmission shown in FIG. 5.

An automatic transmission 30 including a three speed automatic transmission mechanism portion, as shown in FIG. 5, includes a torque converter portion 31, a three speed automatic transmission mechanism portion 10, an annexed transmission part 33, and a differential portion 35. These respective portions are disposed in a trans-axle housing 36, a trans-axle housing case 37 and a trans-axle cover 39 which are attached with one another and integrally formed with respect to one another. The converter portion 31 comprises a torque converter 16 and a lock-up clutch 17 (see FIG. 1) adapted to transmit engine torque to an input shaft 45 disposed within the automatic transmission mechanism portion 10 through oil flow within the torque converter 16 or through the coupling of the lock-up clutch 17. Disposed at an upper portion of the trans-axle case 37 is a valve body 46. Disposed at an intermediate portion between the automatic transmission mechanism portion 10 and the torque converter portion 31 is an oil pump 47.

The three speed automatic mechanism portion 10 is provided with a brake portion 49, an output portion 50, a planetary gear unit portion 51 and a clutch portion 52 arranged in this order in the axial direction from an engine output portion at the outside of the oil pump 47. A hollow shaft 53 is rotatably supported by the input shaft 45. The planetary gear unit portion 51 comprises a single gear unit 12 and a dual gear unit 13. The single gear unit 12 comprises a sun gear $S_1$ formed on the hollow shaft 53, a ring gear $R_1$ and a carrier $CR_1$ supporting a pinion $P_1$ meshed with these gears. The dual unit 13 comprises a sun gear $S_2$ formed on the hollow shaft 53, a ring gear $R_2$, a carrier $CR_2$ carrying a first pinion $P_2$ meshed with the sun gear $S_2$ and a pinion $P'_2$ meshed with the ring gear $R_2$ in such a manner as to be meshed with respect each other. And, the sun gears $S_1$ and $S_2$ (hereinafter simply referred to as S) of both the units 12 and 13 are formed as a gear having same number of teeth formed on the hollow shaft 53. The carriers $CR_1$ and $CR_2$ (hereinafter simply referred to as CR) are integrally formed from three sheets of side board. In this embodiment, separate pinions $P_1$ and $P_2$ are employed. Alternatively, an integral long pinion P may be employed as shown in FIG. 1 and FIG. 6. Further, both the sun gears $S_1$ and $S_2$ may be commonly used. The brake portion 49 is provided with a first one-way clutch $F_1$, a second brake $B_2$ and a first brake $B_1$ arranged in this order from the inner diameter side thereof toward the outer diameter. Disposed at a position adjacent to the respective brakes are hydraulic actuators 55 and 56 formed on a case of the oil pump 47 and arranged parallel with respect to each other in the radial direction. The first brake $B_1$ is interposed between a flange portion 53a attached to the front end of the hollow shaft 53 and a pump case 37a integrally formed with the axle case 37. The second brake $B_2$ is disposed between an outer race and the pump case 37a. The first one-way clutch $F_1$ is disposed between the hollow shaft 53 and the second brake $B_2$. On the other hand, the output portion 50 includes a counter drive gear 59 supported by a partition wall 37b formed on the axle case 37 through a bearing 57. The gear 59 is connected to the carrier CR through a spline. The outer race portion of the bearing 57 is unrotatably fixed to the partition wall 37b and extends outwardly. Disposed between the extended portion and a connecting portion integrally connected to the ring gear $R_2$ is a second one-way brake $F_2$. Disposed between the outer periphery of the ring gear $R_2$ and the axle case 37 is a third brake $B_3$. A hydraulic actuator 60 is disposed to one side of the wall surface of the partition wall 37b. A piston of the actuator 60 extends in the axial direction in a comb tooth shape to control the third brake $B_3$. A return spring is disposed against the comb tooth portion.

The clutch portion 52 includes a first (forward) clutch $C_1$ and a second (direct) clutch $C_2$. These are located at the front end of the automatic transmission mechanism portion 10 and rest in the trans-axle cover 39 portion. As shown in detail in FIG. 6, the input shaft 45 is integrally connected at its front end portion with the flange portion 54 through a connecting boss portion 45b. The flange portion 54 is engaged with a movable member 62. The movable member 62 is engaged with a piston member 63. The flange portion 54 includes a stepped collar portion 54c. The internal peripheral surface of the inner diameter side of the stepped collar portion 54c constitutes a cylinder 54a of a hydraulic actuator 66 for actuating the first clutch $C_1$, while the inner peripheral surface at the outer diameter side thereof is formed with a spline 54d for connecting the clutch $C_1$. The movable member 62 also includes a stepped collar portion 62c and an erected portion 62e at the front end thereof. The internal pheripheral surface of the inner diameter portion thereof constitutes a cylinder 62b of a hydraulic actuator 69 for actuating the second clutch $C_2$. The outer diameter side thereof is formed at its peripheral surface with a spline 62d for connecting the clutch $C_2$. This together with the erected portion 62e constitute a piston 62a of the hydraulic actuator 66. An oil chamber 65 is defined by and between the inner diameter portion of the movable member 62 and the flange portion 54. The erected portion 62e is connected to the spline 54d of the flange potion 54 in such a manner as to prevent only a relative rotation and is disposed opposite to the first clutch with a fine space $d_1$ formed therebetween. On the other hand, an oil chamber 67 is defined by and between the piston portion 63 and the movable member 62. The reverse surface of the piston portion 63 is disposed opposite to the second clutch $C_2$ with a larger space $d_2$ than the space $d_1$ ($d_1 < d_2$) and the front end portion of the piston portion 63 is provided with a check valve 68. The hydraulic actuator 69 is constituted such that when pressurized oil kept within the oil chamber 67 is discharged, it does not easily come off by centrifugal force. However, the check valve 68 is constituted such that it is discharged at a predetermined pressure. As a result, the pressure oil in the oil chamber 67 is promptly discharged. Similarly, the hydraulic actuator 66 for actuating the first clutch $C_1$ is provided with a check valve (not shown). Disposed between the piston member 63 and a ring fixed to the flange connecting boss portion 45b is a spring 70 biased in its contacted state. The spring 70 constitutes a return spring commonly used for the piston members 62 and 63 of both the hydraulic actuators 66 and 69. The first clutch $C_1$ is interposed between the internal periphery of the outer diameter side of the flange portion 54 and the outer periphery of the ring gear $R_1$ of the single unit 12. The second clutch $C_2$ is interposed between the internal periphery of the movable member 62 and the flange portion 53b connected to the front end of the hollow shaft 53. The return spring 70 is disposed in a space formed between the piston member 63 and the flange portion 53b at the inner diameter side of the clutch $C_2$. The trans-axle cover 39 is formed with a supporting annular collar portion 39. The collar portion 39a is adapted to support the input shaft 45 and is formed with an oil path extending therethrough, so that oil is fed to the oil chambers 65 and 67 of the hydraulic actuators 66 and 69 through a hole formed in the boss portion 45b.

On the other hand, the annexed transmission part 33 includes a counter shaft 71 rotatably supported by the axle case 37. The shaft 71 is provided at its front end portion with a single planetary gear unit 72 for an under drive (U/D). Connected to and supported by the shaft 71 is a differential drive pinion 73. A counter drive gear 75 meshing with the counter drive gear 59 is rotatably supported on the hollow boss portion 73a of the pinion 73 through a bearing. The planetary gear unit 72 comprises a sun gear $S_3$, a carrier $CR_3$ supporting the pinion $P_3$ and connected to the differential drive pinion 73, and a ring gear $R_3$ integrally connected to the counter driven gear 75. A boss member 76 formed with the sun gear $S_3$ is rotatably supported by the shaft 71. The boss member 76 is connected with a flange portion 76a. Interposed between the front end of the boss member 76 and the connecting member 37c connected to the axle case 37 is a fourth (U/D) one-way clutch $F_3$. The flange portion 76a is provided at its outer periphery with a fourth (U/D) brake $B_4$ comprising a band brake. Disposed between the internal periphery of the flange portion 76a and the carrier $CR_3$ of the gear unit 72 is a forth (U/D direct) clutch $C_3$. The clutch $C_3$ is controlled by a hydraulic actuator 77 formed within the flange portion 76a. A collar side board 79 constituting the carrier $CR_3$ is provided at its inner side with a spring 80 for returning the actuator 77.

The differential portion 35 includes right and left front axles 81l and 81r rotatably supported by the axle case 37, a differential gear unit 82 and a ring gear mount case 83. The mount case 83 is fixed with a ring gear 85 meshing with the differential drive gear 73, and at the same time adapted to support a pinion 86 of the differential gear unit 82 to constitute the differential carrier. The right and left side gears 87l and 87r of the differential gear unit 82 mesh with the pinion 86 of the differential gear unit 82 and are connected to the right and left front axles 81l and 81r.

Figure 7:
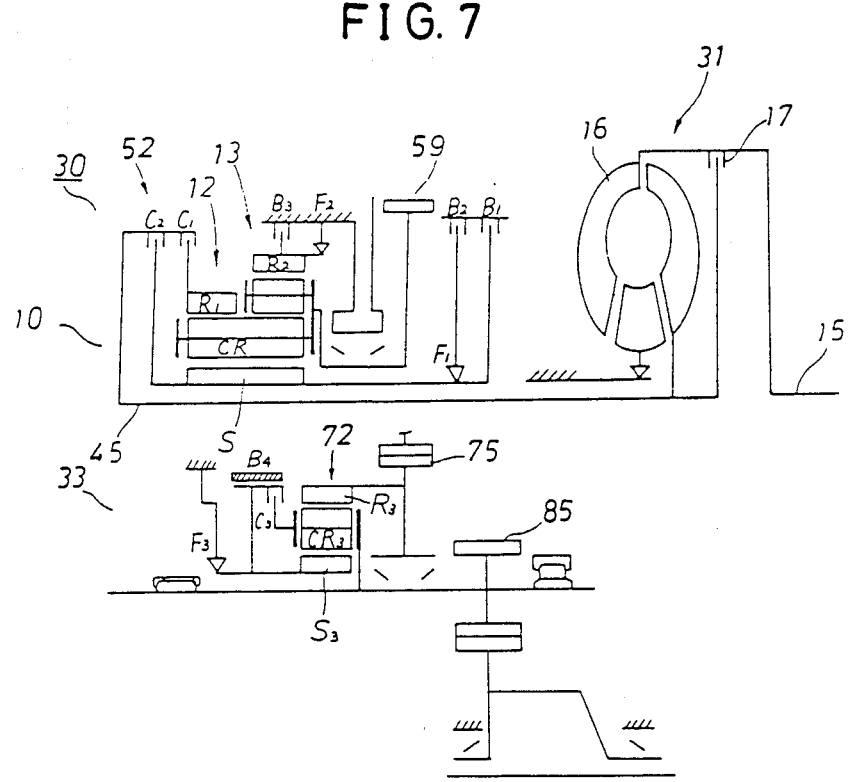
FIG. 7 is a schematic view of an automatic transmission shown in FIG. 5.

Next, operation of the aforementiond embodiment will be described with reference to the schematic view shown in FIG. 7 and operation table shown in FIG. 8.

Engine torque is transmitted to the input shaft 45 of the three speed automatic transmission mechanism 10 through the torque converter portion 31. At the transmission mechanism portion 10, three forward speed and one reverse speed are obtained according to actuation of the respective clutches $C_1$, and $C_2$, respective brakes $B_1$, $B_2$ and $B_3$ and one-way clutch $F_1$ and one-way brake $F_2$ in a manner indicated by the operation table shown in FIG. 2. Gear shifting rotation is transmitted from the counter drive gear 59 to the counter driven gear 75 of the annexed transmission part 33. At the annexed transmission part 33, the output is shifted by two to direct and U/D according to actuation of the clutches $C_3$, brake $B_4$ and one-way clutch $F_3$ according to the operation table shown in FIG. 8. When the shifting state automatic transmission mechanism portion 10 and annexed transmission part 33 are combined, four forward speeds (six speaks are obtainable through maximum combination thereof) are obtainable. That is, when the automatic transmission mechanism portion 10 is in first speed and second speed, and the annexed transmission part 33 is in U/D state, first speed and second speed are obtainable in total. Then, when the automatic transmission mechanism portion 10 is in second speed, the annexed transmission part 33 is shifted to direct to obtain third speed in total. And, in the foregoing state, the automatic transmission mechanism portion 10 is shifted to third speed to obtain four speed in total. The forward four speed rotation is transmitted from the differential drive pinion 73 to the ring gear 85 of the differential portion 35 and further to the right and left front axles 81l and 81r through the differential gear unit 82 to drive the front wheels.

In the above-mentioned embodiment, the planetary gear unit 72 for shifting between direct and U/D is provided to the annexed transmission portion 33. Alternatively, instead of providing the planetary gear unit to the annexed transmission portion 33, a reduction gear formed of gears 75 and 73 may be provied so that it functions as a three speed automatic transmission based on the three speed automatic transmission mechanism portion 10. Otherwise, the annexed transmission part 33 may be eliminated and power may be directly transmitted to the ring gear 85 of the differential portion 35 from the counter drive gear 59 as a matter of course.

Figure 9:
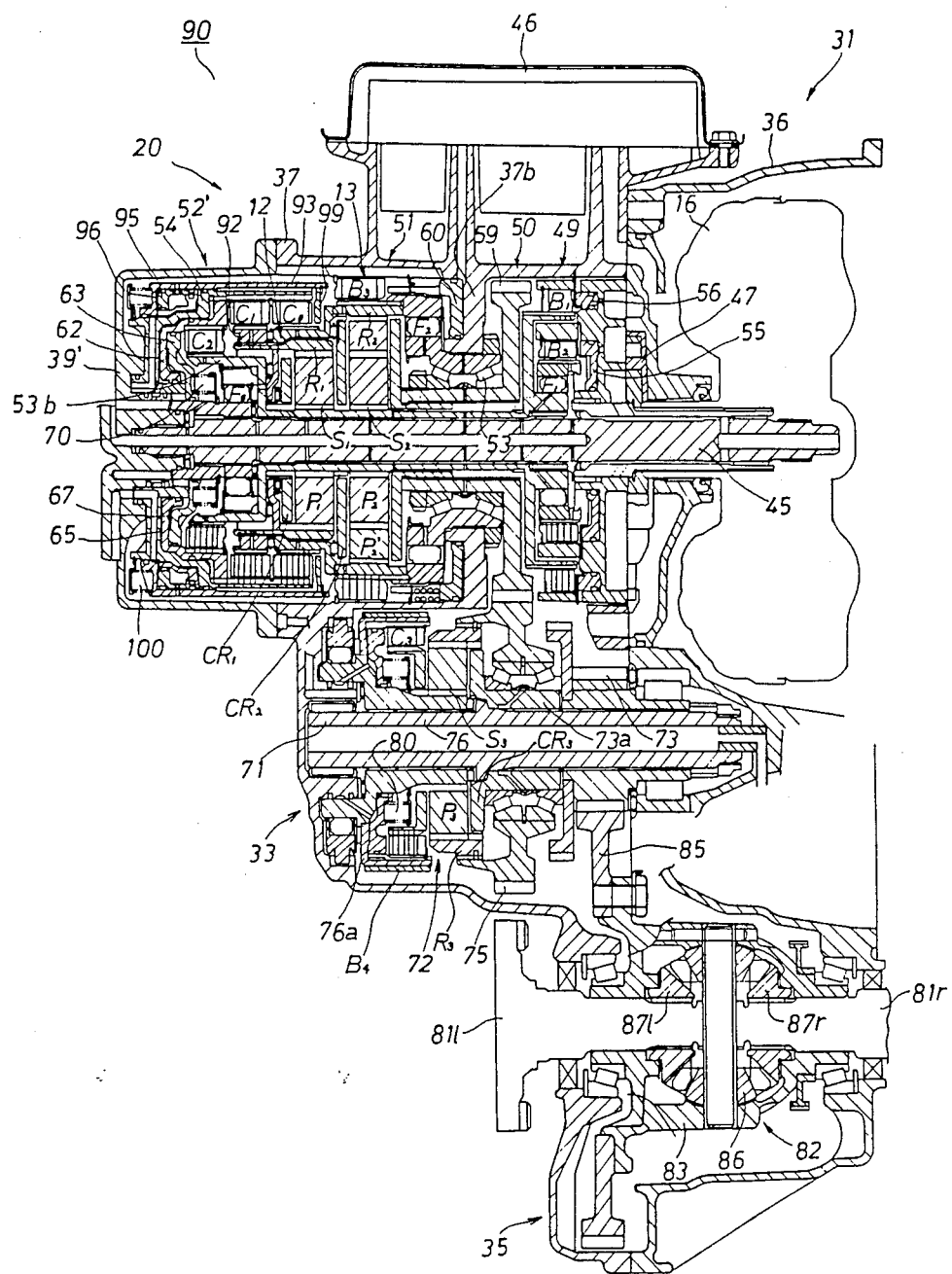
FIG. 9 is an illustration showing one embodiment of a four speed automatic transmission mechanism which is constituted by slightly modifying the automatic transmission shown in FIG. 5.
Figures 10, 11:
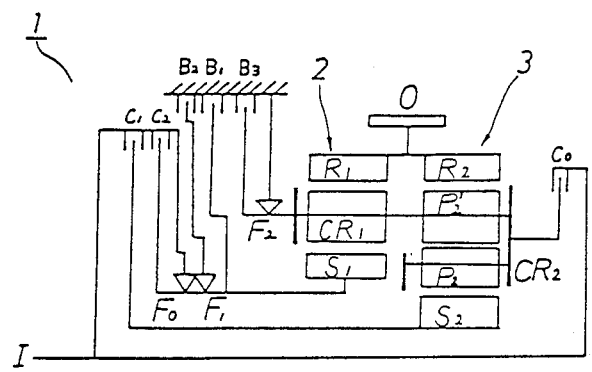
FIG. 10 is a schematic view showing a conventional Ravigneaux type automatic transmission.
FIG. 11 is an illustration showing the actuating state of the respective elements of the automatic transmission of FIG. 10.

Next, an automatic transmission 90 will be described including a four speed automatic transmission mechanism which is constituted by slightly modifying the aforementioned three speed automatic transmission mechanism portion with reference to FIG. 9. Since this automatic transmission is substantially the same as the one described in the above embodiment with the only exception being a clutch portion of the automatic transmission mechanism portion, identical reference numerals will be used for identical parts throughout and description thereof will be omitted.

The automatic transmission 90 includes a four speed automatic transmission mechanism portion 20. The transmission mechanism portion 20 includes a clutch portion 52' at its front end portion, that is, the portion covered with a trans-axle cover 39'. The clutch portion 52' is provided with a third clutch $C_o$ disposed parallel to the first clutch $C_1$ in the axial direction. Disposed between a return spring 70 and a flange portion 53b is a third one-way clutch $F_o$. Accordingly, since the third clutch $C_o$ and one-way brake $F_o$ are differently located in the radical direction, the transmission according to this embodiment is longer than the three speed automatic transmission mechanism portion 10 by a substantially wide length of the clutch $C_o$ in the axial direction. Although the constitution of the first clutch $C_1$, second clutch $C_2$, and hydraulic actuators thereof is generally the same as in the aforementioned three speed automatic transmission mechanism portion 10, they are different in that a ring gear $R_1$ engaged with the first clutch $C_1$ is engaged through a connecting member 92, a collar portion of a flange portion 53b engaged with the second clutch $C_2$ is long in the axial direction, and that a flange portion 54 connected to the front end of an input shaft 45 is long in the axial direction. The flange portion 54 is provided at its outer periphery with a cylindrical movable member 93. The internal peripheral surface of one end of the movable member 93 is oiltight with a reaction member 95 engaged with the flange portion 54 and constitutes an actuator for a third clutch $C_o$ including an oil chamber 96. The movable member 93 is provided at its front end with a tongue member 99 abuttable against the third clutch $C_o$ hanging down in the inner diameter direction and fixed thereto. Disposed between the other end of the movable member 93 and a ring fixed to the flange portion 54 is a return spring 10 biased in its contracted state.

Since the automatic transmission 90 is constituted as mentioned above, rotation of the input shaft 45 transmitted through the torque converter portion 31 enables a forward four speed and reverse one speed to be obtained by the four speed automatic transmission mechanism portion 20 based on operation of the respective clutches $C_1$, $C_2$ and $C_o$, respective brakes $B_1$, $B_2$ and $B_3$, and respective one-way clutch $F_1$ and one-way brakes, $F_2$ and $F_o$ according to the operation table shown in FIG. 4 as mentioned before. The shifting rotation is combined with two shifts, direct and U/D, at the annexed transmission part 33, and six forward speeds are obtainable (eight speeds are obtainable through maximum combination) in total. It is preferable with respect to a gear ratio and smooth shifting, if the foregoing combination obtains one speed in total through combination of first speed of the four speed automatic transmission mechanism portion 20 and U/D of the annexed transmission part 33, then obtains second speed in total by shifting the annexed transmission part 33 to direct while maintaining the mechanism portion 20 in first speed, then, obtains a third speed in total by shifting the mechanism portion 20 to second speed and shifting the annexed transmission part 33 to U/D, then, obtains a four speed in total by shifting only the annexed transmission part 33 to direct, and in the foregoing direct state, obtains a fifth speed and sixth speed in total by shifting the automatic transmission mechanism portion 20 to third speed and fourth speed. Alternatively, it may be arranged such that a forward fifth speed is obtainable in total by canceling the second speed state wherein the automatic transmission mechanism portion 20 is first speed and the annexed transmission part 33 is U/D.

The automatic transmission 30 including the three speed transmission mechanism portion 10 and the automatic transmission 90 including the four speed transmission mechanism portion 20 comprises mostly commonly usable parts including the trans-axle case 37 and trans-axle housing 36. They can be assembled by the use of almost the same equipment and on almost the same assembly line. Both the automatic transmission 30 and 90 are easily manufactured by slightly modifying the trans-axle covers 39 and 39', and the clutch portions 52 and 52'.

Based on the foregoing embodiments, the effects of the respective embodiments will be summarized as follows. If the first one-way clutch $F_1$ and one-way brake $F_2$ are employed, all shifting can be performed through the one-way clutch, sufficient time is available for operation which enables the clutch and brake to operate easily and surely, and a smooth shift is obtainable since a possible shift shock due to change of grasping is eliminated.

Further, if the sun gear S of the single planetary gear unit 12 and the dual planetary gear unit 13 are commonly used, and the transmission includes a long pinion P integrally formed of the carrier pinion $P_1$ of the single unit 12 and one of the carrier pinions $P_2$ of the dual planetary gear unit 13, machining performance and productivity can be improved, and the transmission can be made much more compact.

Furthermore, if the piston 62a of the hydraulic actuator 66 for actuating the first clutch $C_1$ and the cylinder 62b of the actuator 69 for actuating the second clutch $C_2$ are formed of a commonly usable movable member 62, the return spring 70 is commonly used for both the hydraulic actuators 66 and 69, and the connecting members 54d and 62d of the respective clutches $C_1$ and $C_2$ are formed of the flange portion 54 and movable member 62 constituting the cylinders 54a and 62b of the respective hydraulic actuators, the clutches $C_1$ and $C_2$ can be disposed together and at the same time, the transmission can be made compact. Particularly, the length of the automatic transmission mechanism can be made small in the axial direction.

Furthermore, if the flange portion 54 and the movable member 62 includes a stepped collar portion, the stepped portion at the inner diameter side thereof forms the cylinders 54a and 62b, and the stepped portion at the outer diameter side thereof forms the clutch connecting portions 54d and 62d, the clutches $C_1$ and $C_2$ and the hydraulic actuators 66 and 69 can be assembled and disassembled easily. Thus, assembling and maintenance performance can be improved.

Furthermore, if the first clutch $C_1$ is disposed at the outer diameter side of the ring gear $R_1$ of the single gear unit, the second clutch $C_2$ is disposed parallel to the ring gear $R_1$ in the axial direction, and the return spring 70 is disposed at the inner diameter side of the second clutch $C_2$, they can be disposed without producing a wasteful space. Thus, the transmission can be made much more compact. If the first clutch $C_1$, second clutch $C_2$, return spring 70, movable member 62 and piston member 63 all covered with the flange portion 54 are put together on the front end portion of the automatic transmission mechanism 10, the clutch portion 6 can be replaced and modified easily and the third brake $C_o$ and the one-way clutch $F_o$ can be attached easily. Because of the foregoing constitution, the three speed and four speed automatic transmission mechanism 10 and 20 are easily obtainable with a minor change, thus enabling needs of many vehicles to be met.

Although the present invention has been described with reference to the preferred embodiment, the embodiment described herein is for illustrative purposes only and not in limitation thereof. Also, the scope of the present invention is defined in the appended claims and will not be bound by description of the embodiment. Accordingly, it will be understood that all changes and modifications which belong to the appended claims fall within the true spirit and scope of the present invention.

What is claimed is:

1. An automatic transmission mechanism comprising:
 a single planetary gear unit;
 a dual planetary gear unit;
 carriers of both of the planetary gear units that are connected to one another;
 carrier pinions of both of the planetary gear units that are connected to one another;
 sun gears of both of the planetary gear units that are connected to one another, said sun gears that are connected to one another meshing with said carrier pinions that are connected to one another;
 an output member to which said carriers are connected;
 a ring gear of the single planetary gear unit that meshes with said carrier pinions that are connected to one another;
 an input member for inputting engine torque to the gear units operatively connected to said ring gear of the single planetary gear unit through a first clutch means, the first clutch means being engaged to connect the input member and said ring gear of the single planetary gear unit whenever the transmission mechanism is in a forward travelling mode including when the transmission is in first speed, the input member also being operatively connected to said sun gears that are connected to one another through a second clutch means;
 first retaining means for restricting rotation of said sun gears;
 a ring gear of the dual planetary gear unit meshing with another carrier pinion of the dual planetary gear unit that is not connected with the carrier pinion of said single planetary gear unit; and
 second retaining means for restricting rotation of said ring gear of the dual planetary gear unit.

2. An automatic transmission mechanism as claimed in claim 1,
 wherein said first retaining means comprises a first brake for directly preventing said sun gears from rotating, and a second brake and a first one-way clutch for restricting rotation of said sun gears to unidirectional rotation; and
 said second retaining means comprises a third brake for directly preventing said ring gear of said dual planetary gear unit from rotating and a one-way brake for restricting rotation of said ring gear of said dual planetary gear unit to unidirectional rotation.

3. An automatic transmission mechanism as claimed in claim 1,
wherein said sun gears of both of the planetary gear units are integral with one another; and
said carrier pinions of both of the planetary gear units that are connected together comprise a long integral pinion.

4. An automatic transmission mechanism comprising:
a single planetary gear unit;
a dual planetary gear unit;
carriers of both of the planetary gear units that are connected to one another;
carrier pinions of both of the planetary gear units that are connected to one another;
sun gears of both of the planetary gear units that are connected to one another, said sun gears that are connected to one another meshing with said carrier pinions that are connected to one another;
an output member to which said carriers are connected;
a ring gear of the single planetary gear unit that meshes with said carrier pinions that are connected to one another;
an input member for inputting engine torque to the gear units operatively connected to said ring gear of the single planetary gear unit through a first clutch means, the first clutch means being engaged to connect the input member and said ring gear of the single planetary gear unit whenever the transmission mechanism is in a forward travelling mode including when the transmissionn is in first speed, the input member also being operatively connected to said sun gears that are connected to one another through a second clutch means;
first retaining means for restricting rotation of said sun gears;
a ring gear of the dual planetary gear unit meshing with another carrier pinion of the dual planetary gear unit that is not connected with the carrier pinion of said single planetary gear unit;
an end portion at which said first and said second clutch means are disposed;
a flange portion fixed to said input member and connected to said first clutch means for defining a cylinder of a hydraulic actuator for actuating said first clutch means;
a movable member movably mounted to said flange portion for moving therealong in a direction toward and away from said first clutch means, said direction corresponding to an axial direction extending along an axis of the transmission mechanism, the movable member being a piston of the hydraulic actuator for actuating the first clutch means, and the movable member connected to said second clutch means for defining a cylinder of a hydraulic actuator for actuating said second clutch means;
a piston member movably mounted to said movable member for moving therealong in said axial direction toward and away from said second clutch means, the piston member being a piston of the hydraulic actuator for actuating said second clutch means; and
a return spring engaged with said piston member for biasing said piston member and said movable member to a return position.

5. An automatic transmission mechanism as claimed in claim 4,
wherein said flange portion and said movable member each comprises a stepped collar, each stepped collar comprising a respective cylinder of said hydraulic actuators at a portion thereof adjacent the inner diameter thereof and a clutch connecting portion connected to a respective one of said clutch means at a portion thereof adjacent the outer diameter thereof.

6. An automatic transmission mechanism as claimed in claim 4,
wherein said first clutch means is disposed along the outer diameter of said ring gear of the single planetary gear unit,
said second clutch means is spaced from said ring gear of the single planetary gear unit in said axial direction and extends parallel thereto,
said return spring is disposed adjacent said second clutch means at an inner diameter portion thereof, and
said first clutch means, said second clutch means, said return spring, said movable member and said piston member are all disposed within said flange portion at said end portion of the transmission mechanism.

* * * * *